United States Patent Office 3,284,858
Patented Nov. 15, 1966

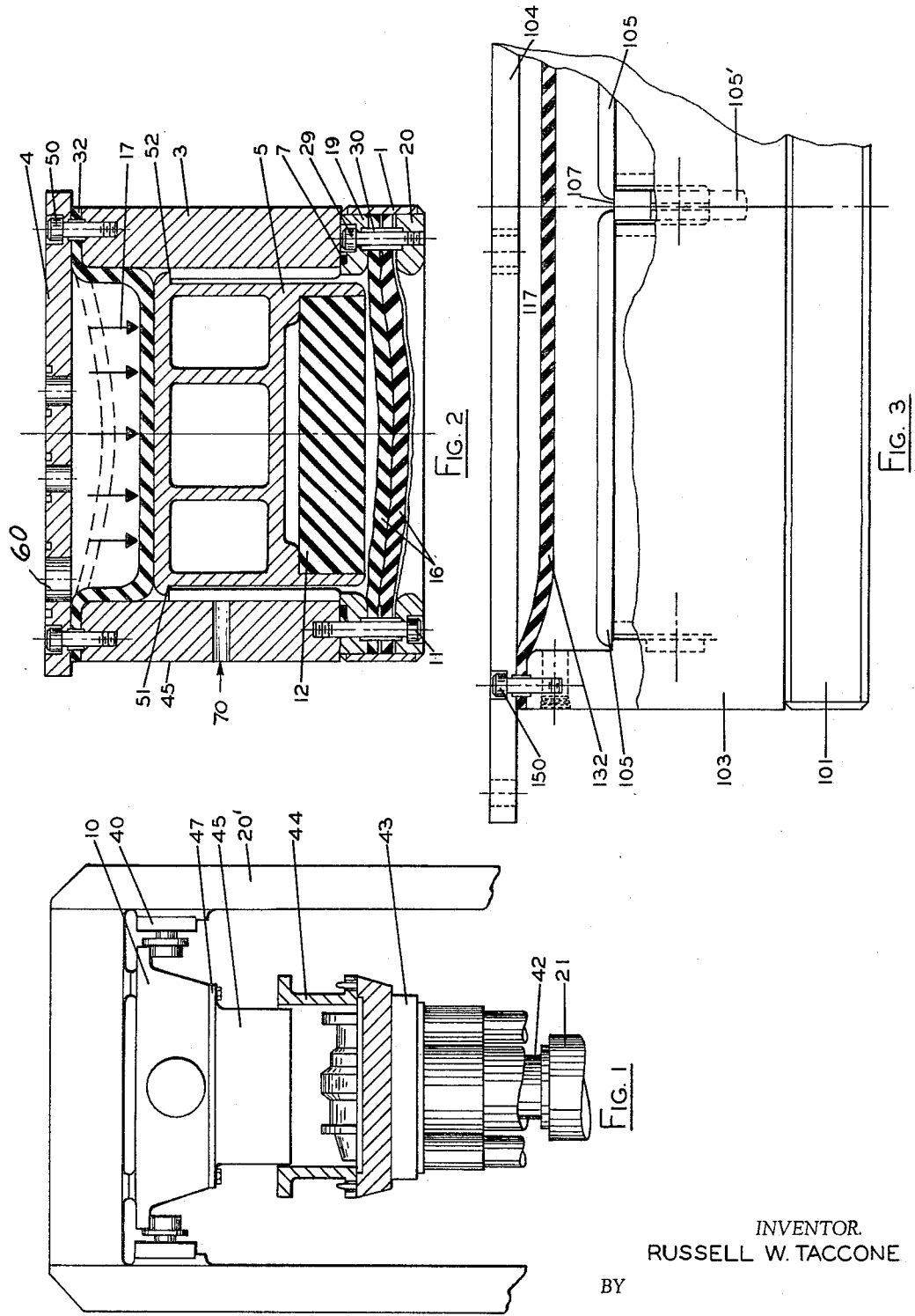

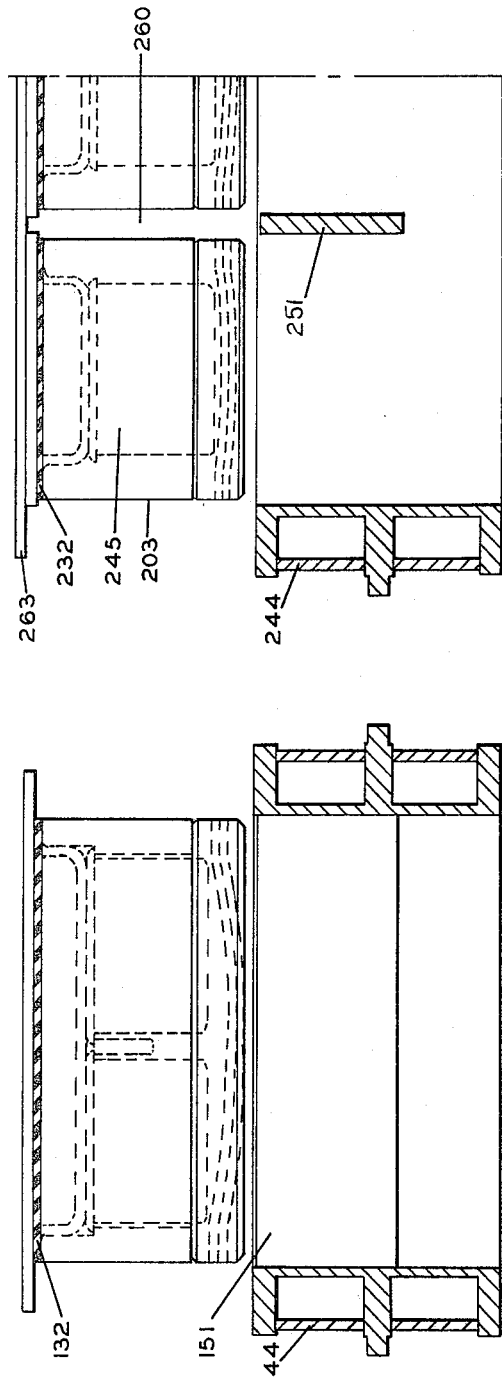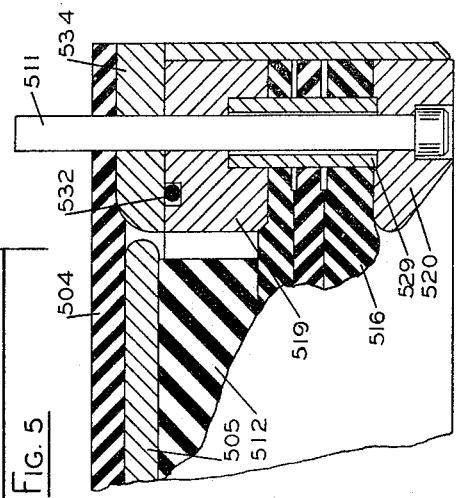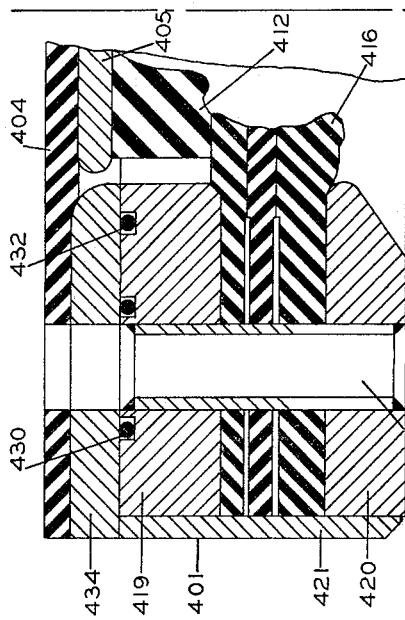

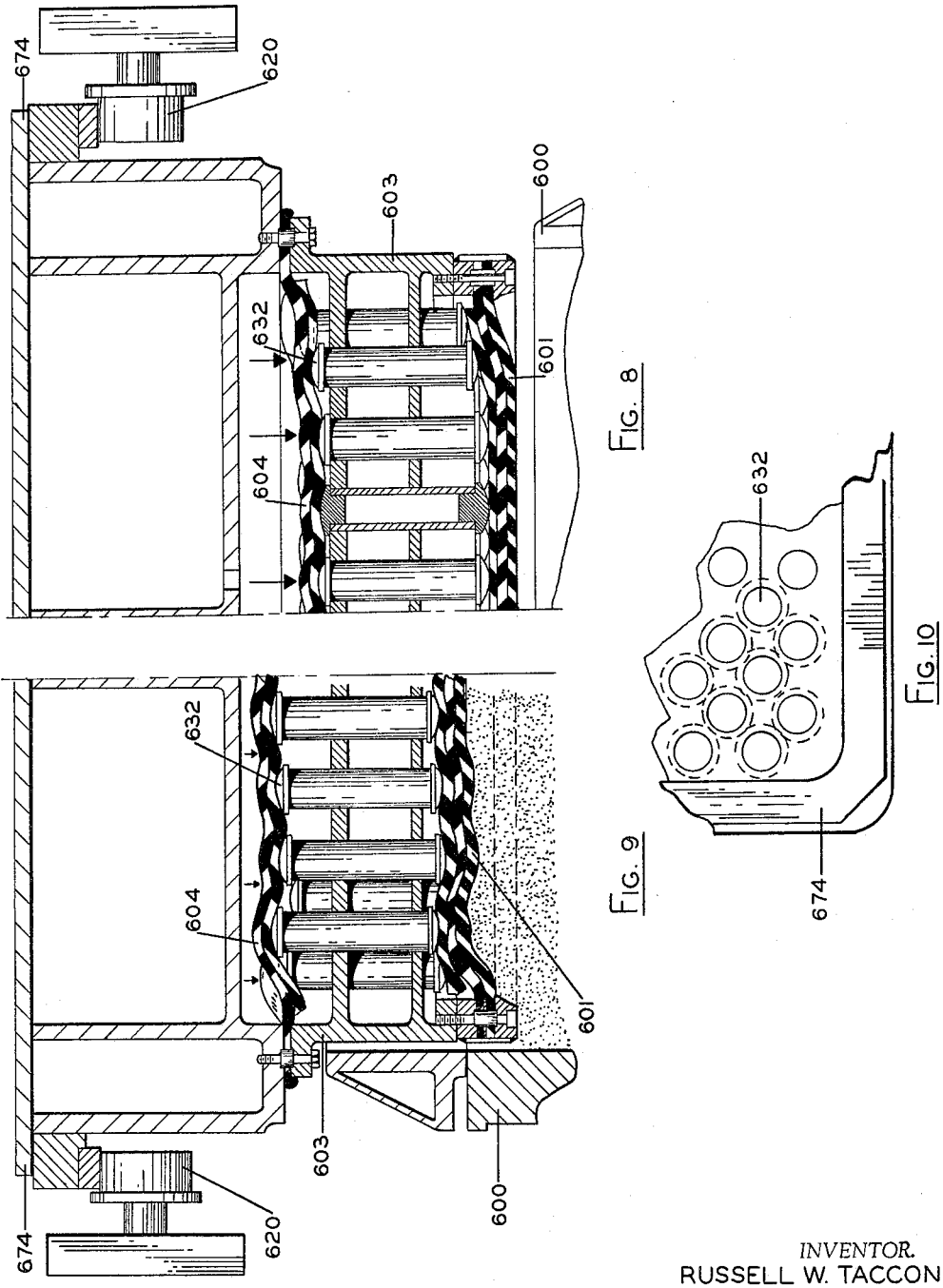

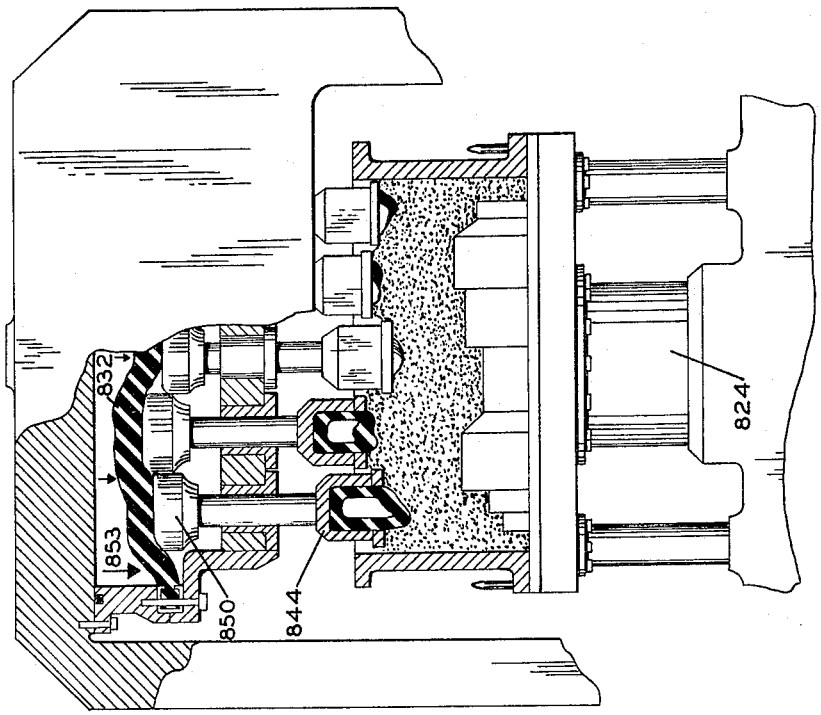
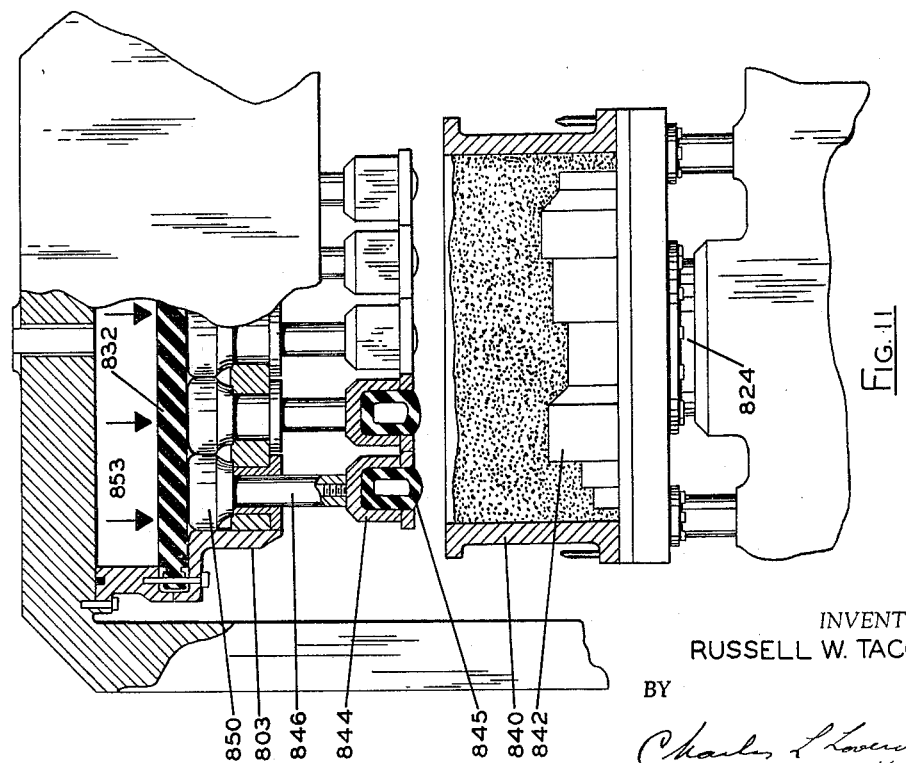
INVENTOR.
RUSSELL W. TACCONE

3,284,858
MOLDING MACHINE AND HEAD WITH PRESSURE COMPENSATING PROVISION
Russell W. Taccone, Erie, Pa., assignor to Taccone Corporation, Erie, Pa., a corporation of Pennsylvania
Filed Feb. 18, 1964, Ser. No. 345,707
9 Claims. (Cl. 22—46)

This invention relates to molding machines, and, more particularly, to machines for making green sand molds.

This application is an improvement on Patent No. 3,041,685.

The previous patent involved a molding machine in which a hollow molding machine head had an open side closed by a relatively thick combination layers of diaphragm made of resilient material with gas pressure behind the diaphragms. A positive rigid backup plate member was supported in a spaced relation to the diaphragm. This was necessary so that, initially, a diaphragm was backed up by the gas pressure while an initial force was exerted on the sand and, thereafter, the diaphragms came in contact with the plate and a final greater pressure was exerted in the sand.

In addition to the foregoing, it was desirable in some cases, to have a relatively thick diaphragm, or combination of diaphragms, which would themselves be deformed under pressure so that the diaphragms themselves would adjust to the contour of the final molding surface and thereby compensate for the mold hardness throughout the sand of the mold. This back up could in some cases be a resilient material such as hard rubber or other suitable material which would further enhance the effect of a positive yet somewhat resilient backup plate.

As the thick diaphragm came in contact with sand during the pre-squeeze stroke, air was injected above the diaphragm, forcing it downward, in an effort to contour the top surface of the mold and to displace the sand from the center of the mold toward the periphery, or toward the flask walls. This moved the displaced sand toward and under the rigid or outer frame of the diaphragm retaining ring.

As the head continued into the sand, the sand would force the diaphragm upward into the diaphragm tank, compressing the air and thus beginning to form a compensating action on top of the diaphragm. As the ram continued moving, the pressure under the solid ring on the outer side of the mold, or on the flask walls, would pack harder, forcing a flow of sand inward and thus cause an actual flow or movement of the sand which would work in toward the middle of the mold and would work upward further pushing the diaphragm up into the head. Thus, the sand movement into the mold was controlled and the proper compensation was applied from above.

The molding machine disclosed in the said patent had certain limitations in that the ability or the amount of compensation that was available was dependent upon the flexing of the diaphragm, the size of the chamber above the diaphragm, and the volume of air that was applied. This placed a limitation upon the application of the machine to approximately three inches as a maximum difference in pattern height characteristics of the mold to be made.

It is an object of the present invention to improve the machine disclosed in the said patent and to make an adjustable backup pad, not only to gain an additional overall compensation, but by adjusting the height of the backup pad, relative to the thick compensating pad, it is possible to control the compression of the air in the chamber and at the same time this controls the compensating action of the initial phase of the squeezing stroke.

One of the main objects of this invention is to achieve additional compensation in foundry molds over that possible in prior machines.

Another object of this invention is to provide an adjustable backup pad for a molding machine. By making this backup pad into a segmented or separate compartmented head, it is possible to adjust any one or group of these within the same compensating head itself.

Another object of this invention is to provide a molding machine head having an upper and a lower section which may use lower air pressure in the bottom section of the compensating head than in the top. This will minimize the chance of the lower diaphragm rupturing or blowing out, and thus insure a longer life and more trouble-free operation of the compensating pad itself.

Another object is to provide a molding machine and head in combination therewith which is simple in construction, economical to manufacture, and simple and efficient to use.

Another object is to provide an improved combination molding machine and molding head.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a side generally schematic view partly in cross section of a molding machine with the head thereon;

FIG. 2 is a longitudinal cross sectional view of the head shown in FIG. 1;

FIG. 3 is a side view partly in cross section of another embodiment of the head;

FIG. 4 is a partial cross sectional view of the embodiment of the invention shown in FIG. 3;

FIG. 5 is a cross sectional view of yet another embodiment of the invention;

FIG. 6 is a side view partly in cross section of yet another embodiment of the invention;

FIG. 7 is a partial cross sectional view of another embodiment of the invention;

FIG. 8 is a cross sectional view of another embodiment of the invention;

FIG. 9 is a view similar to FIG. 8 of the head in molding position in engagement with sand;

FIG. 10 is a top view of the machine shown in FIGS. 8 and 9; and

FIGS. 11 and 12 are views of another embodiment of the invention;

Figure 13:
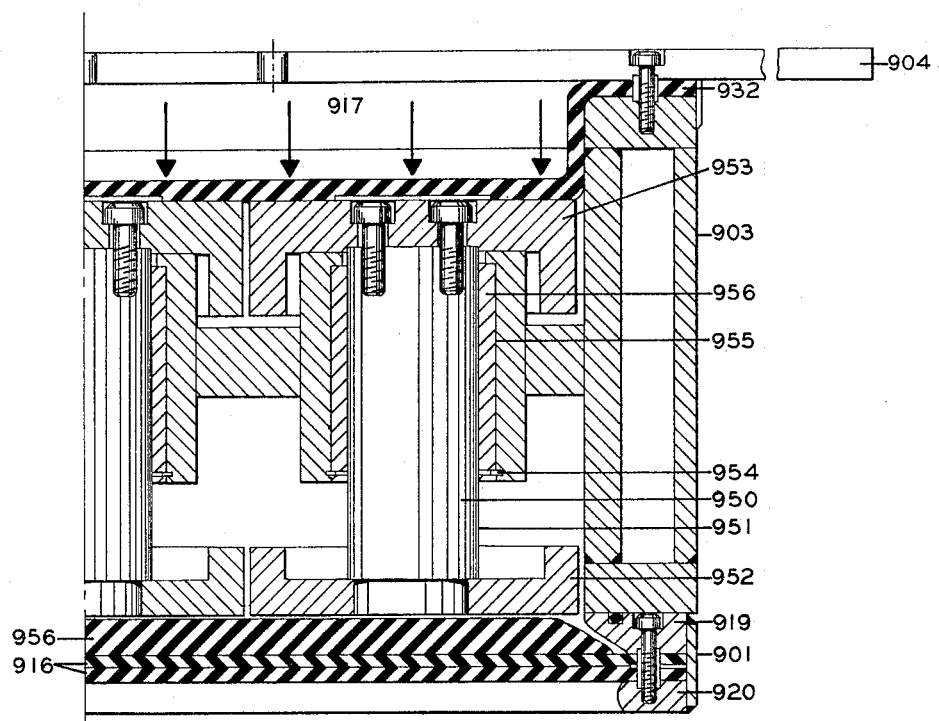
FIG. 13 is a cross sectional view of another embodiment of the head.

Now with more particular reference to the drawings, the molding machine shown with certain parts removed in FIG. 1 has a frame 20' with a hydraulic cylinder 21 having a piston rod 42 attached to a pattern plate 43 for lifting the flask 44 to bring sand therein into engagement with the head 45. The head is fixed to a frame 10 at 47. The frame 10 has flanges that are supported on and carried on roller conveyors 40.

The molding head shown in FIG. 2 is a longitudinal cross sectional view of FIG. 1. It is made up of the compensating head upper box 3 which generally forms an enclosure open at the top and at the bottom. The pad assembly 1 is made up of the open frames 19 and 20 which are fixed to the head by means of cap screws 11. The frames 19 and 20 are clamped together by cap screws 29 which extend through counterbored holes in frame 19 and threadably engage frame 20. The frames 19 and 20 are held in spaced relation by means of tubes 30 and a seal is provided between the frame 19 and the compensating head box. The seal comprises an O-ring 7.

The top plate 4 is held on the box 3 by means of cap screws 50 and it clamps the outer peripheral edge of the upper diaphragm 32 between it and the upper box 3.

The back up block or pad 12 may be made of resilient material and it lines the lower part of the inside of the plunger 5. During operation the compensating plunger 5 moves up and down between the lower diaphragm 16 and the upper diaphragm 32. The compensating pad 12 which is fixed to the lower end of plunger 5 may be made of foam rubber, expanded plastic, or some other suitable material.

In order to obtain both the additional compensation and the adjustment required for the backup pad, the second diaphragm 32 is used which is contained within the upper box 3. The lower compensating pad 12 is limited in upward movement by the compensating plunger 5. Upper diaphragm 32 is limited in downward movement by movable or compensating plunger 5.

The head 45 is in effect, basically divided into two separate parts to carry out two operations. The first operation which is performed by the lower area of the head, is fundamentally exactly the same as the head in the Patent No. 3,041,685 with the exception that the compensating pad 12 is now movable. The second function of this compensating head is the upper or top area in which an upper diaphragm 32 is provided in a self-contained area in which to control the movement up and down of the intermediate floating or moving back-up block 12. The backup block of the plunger 5 has outwardly extending lugs 51 on it which form downwardly facing shoulders which engage shoulder 52 and limit its downward motion. This pad 12 acts as the bottom extremity of the movable parts of the plunger 5 when the upper diaphragm is extended. By limiting the expansion of this diaphragm 32, it is possible to obtain an almost unlimited life of the diaphragm 32 without any fear of its blowing out or rupturing.

During operation a flask is filled with sand and placed below the head as in FIG. 1. Then the compensating plunger is driven downward by injecting air into the chamber above the upper diaphragm 32. This diaphragm extends downward and usually has high pressure to begin with, say sixty to eighty or ninety pounds. This chamber is self-contained and the air is usually sealed in this chamber so that it does not move in and out as each mold is formed. Air could be admitted and withdrawn however from openings 60.

Low pressure air is injected at 70 into the cavity above the double diaphragm 16 on the lower compensating pad assembly. As the squeezing action progresses by piston rod 42 the compensating pad 12 and diaphragm 16 start moving upward, compressing the air between diaphragm 16 and diaphragm 32 around the compensating plunger 5. As the pressure therein, which usually starts out about 20 to 30 p.s.i. before the mold is started to squeeze, increases, and reaches an equivalent pressure to the higher pressure in the upper chamber above diaphragm 32, the compensating plunger 5 will start moving upward against the face of diaphragm 32. Until this pressure is reached, however, the primary compensating action is performed in the space below diaphragm 32. When plunger 5 starts to move diaphragm 32 the secondary compensation starts. As the compensating plunger 5 starts raising, it starts compressing the air in the upper chamber 17, which is trapped therein. This air starts compressing until its pressure reaches whatever pressure is equal to the pressure on the sand itself.

By controlling the pressure in the upper chamber 17, the pressure at which the entire compensating plunger will begin to move can be controlled. If the pressure in the upper chamber is low and equal to the pressure in the lower chamber, then the instant squeezing action is started, the plunger will start rising and both chambers will be compressed equally. If the pressure in the upper chamber is slightly higher, the plunger will not start rising until the pressure in the bottom chamber equalizes the pressure in the top and exceeds it enough or sufficiently to cover the additional weight of the plunger itself.

By controlling the pressure in the upper chamber, relative to the pressure in the lower chamber, it is possible to determine at what pressure the secondary compensating action will begin to take place. By the use of the segmented head, as shown in FIG. 4, or by several heads, or by several independent floating compensating plungers, each within the same compensating head as shown in FIGS. 3, 4, and 5, a greater versatility or utilization may be obtained.

One compensating had may be provided for each section of a flask divided by bars so no actual squeezing is done on the bars themselves as shown in FIG. 5. In order to minimize height, this internal floating pad or compensating plunger, could be a plate as shown in FIG. 6, or could be of many varied constructions.

In the embodiment of the invention shown in FIGS. 3 and 4, a molding machine head is shown which can be used on a machine such as shown in FIG. 1 and, for example, would be used in the case of very large flasks or flasks having bars 151 extending across them. The head shown in FIG. 3 has an upper box 103 which has a top plate 104 attached thereto by studs 150. The top plate 104 and upper box 103 sandwich the outer peripheral edges of the upper diaphragm 132 therebetween. The compensating plungers 105 are fitted into and they may move in a plurality of recesses similar to that in the upper box 3 of FIG. 2 which have partitions 105' therein and these partitions have upwardly facing shoulders 107 which support the flanges of the compensating plungers 105.

A pad assembly 101 is attached to the head similar to the compensating pad assembly 1 in FIG. 2. The head may be used with a flask such as flask 144 shown in FIG. 4. Air under pressure may be introduced through the inlet into the space 117 between plate 104 and the diaphragm 132 to force plungers 105 downward.

In the embodiment of the invention shown in FIG. 5, a flask 244 is adapted to receive sand to form a mold. It has transverse bars 251 of a conventional type therein fixed to the inside walls of the flask at their ends. The head 203 is made up of a plurality of spaced upper boxes 245 such as the head 45 shown in FIG. 2. The upper boxes 245 each have a diaphragm 232. Spaces 260 are formed between the heads. The heads are all fixed to a common plate 263 and they move in unison into the flask 244. Thus, when they are moved into engagement with the top of the sand in the flask 244, the bars 251 pass between the upper boxes 245 into the grooves 260 and thereby pack the sand rigidly around the bars.

FIG. 6 shows a detail diaphragm frame such as the pad assembly 1 in FIG. 2. The multi-layer diaphragms 416 are clamped between the frame 419 and the frame 420. These frames are held together by band 421 which is welded to them and they sandwich the diaphragm therebetween. Sleeves 429 hold frames 419 and 420 together. An O-shaped sealing ring 430 is received in a groove around the sleeves 429 and a second sealing ring 432 is received in a groove which extends around the entire frame, thus forming a seal between the plate 434 and the frame 419. The plate 434 rests against the diaphragm 404 and the resilient back up block 412 which is fixed to a rigid plate 405 is received between the multilayer diaphragm 416 and the diaphragm 404. Thus the plate 405 and the cushion 412 replace the plunger 5 in FIG. 2.

A bolt may extend through the sleeve 429 and attach the assembly shown in FIG. 6 to an upper box such as box 45 in FIG. 2.

In the embodiment of the invention shown in FIG. 7, the multilayer diaphragm 516 is supported between the open frames 519 and 520. The sleeve 529 holds the frames 519 and 520 in spaced relation. The frame 534 is sealed to frame 519 by means of a sealing ring 532 in the groove shown and the pad 512 is fixed to a rigid plate 505. The entire assembly shown in FIG. 7 may be fixed to the bottom part of an upper box or head such as 3 in FIG. 2. A plate such as 4 may be supported over the diaphragm 504 by means of the bolts 511, thereby forming a cushioned head as shown in FIG. 5.

In the embodiment of the invention shown in FIGS. 8, 9, and 10, the compensating plunger is replaced by the plurality of plungers 632, and the spaced plungers are centrally supported in the box 603. The lower ends and upper ends are both flanged and rounded and they engage the diaphragms 604 and 601 at opposite ends, respectively. The head assembly is fixed to the supporting frame 674 which is carried on a conveyor 620 and may be supported over a flask 600. Thus, the spaced plungers 632 perform the same function as the plungers 5 in FIG. 1 but they distribute the load of the compressed air more evenly in case of large flasks.

In FIGS. 11 and 12, the compensating rod assembly is replaced by a series of individual compensating heads 844 which are guided vertically in the upper box 803 and restrained in the upward movement by the upper diaphragm 832.

A flask 840 is supported on a plunger 824 with a molding head supported on the machine frame. The molding head has reciprocable member 846 supported in the head. They have diaphragms 845 within enclosures 844. These enclosures may contain compressed air or other compressible material. The upper ends of the reciprocable members 846 have the heads 850 thereon which are engaged by a diaphragm 832. This diaphragm may be pushed up and down by compressed air in cavity 853. Thus, when the flask 840 is forced upwardly by the piston connected to plunger 824, the diaphragms 845 are brought into engagement with the sand. They will, in turn, exert a force by means of heads 850 against the diaphragm 832 and compress the air in the chamber 853. Thus, the force of the diaphragm will be evenly distributed.

In FIG. 13 the floating compensating block (5 in FIG. 2) is replaced by center guided piston type moving block 950. This piston type moving block consists of a center guide rod 951, a bottom plate 952, and a top plate 953. The center guide rod 951 is guided by a replaceable bushing 956, which is held in place by a retaining ring 954. The bushing 956 is retained in a machined housing 955 which is part of the main box 903. The pad assembly 901 is basically the same as 1 of FIG. 2 with shape of frames 919 and 920 revised slightly. The lower compensating pad 916 is backed up by an additional shaped material 956 similar to the material of 916.

Air is injected into the chamber 917 formed between the top plate 904 and the upper diaphragm 932. The action and additional compensating effect is the same, but a different method is used for the intermediate moving member.

The embodiments of the invention in which an exclusive property or privilege is claimed are defined as follows:

1. A molding machine comprising in combination,
   a frame, a flask support, a flask adapted to be supported on said flask support, a head on said frame, and means to move said head and flask support relative to each other,
   said head comprising a head box closed at the top,
   an upper diaphragm made of flexible material supported inside said head and defining with said closed top a first closed chamber adapted to contain fluid under pressure,
   means to admit air under pressure to said first closed chamber and to confine said air therein,
   a lower diaphragm disposed on the lower end of said open head and forming a second closed chamber adapted to contain fluid under pressure,
   means to admit air to said second closed chamber at a lower pressure than said air to said first closed chamber and to confine said air therein,
   a compensating plunger in said head between said diaphragms, said plunger being freely slidable up and down in said head and engaging said lower diaphragm and adapted to engage said upper diaphragm.

2. A molding machine comprising, in combination,
   a frame, a flask support, a flask adapted to be supported on said flask support, a head on said frame, and means to move said head and flask support relative to each other,
   said head comprising a head box closed at the top,
   an upper diaphragm made of flexible material supported inside said head and defining with said closed top a closed chamber adapted to contain fluid under pressure,
   a lower diaphragm disposed on the lower end of said open head and forming a closed chamber adapted to contain gas or liquid under pressure,
   a compensating plunger in said head between said diaphragms,
   said plunger being freely slidable up and down in said head and engaging said lower diaphragm and adapted to engage said upper diaphragm,
   and a resilient pad on the lower end of said plunger,
   said pad engaging said lower diaphragm.

3. A molding machine head comprising a head box closed at the top,
   an upper diaphragm made of flexible material supported inside said molding machine head and defining with said closed top,
   a closed chamber adapted to contain gas or liquid under pressure,
   a series of individual compensating heads guided vertically in said head and restrained in their upward movement by the upper diaphragm,
   the lower ends of said heads having means adapted to engage molding sand.

4. The machine recited in claim 3 wherein
   each individual compensating head contains compressed gas,
   flexible means for engaging molding sand,
   said flexible means being in contact with said compressed gas.

5. A molding machine comprising, in combination,
   a frame, a flask support, a flask adapted to be supported on said flask support, a head on said frame, and means to move said head and flask support relative to each other,
   said head comprising a head box closed at the top,
   an upper diaphragm made of flexible material supported inside said head and defining with said closed top a closed chamber adapted to contain fluid under pressure,
   a lower diaphragm disposed on the lower end of said head and forming a closed chamber adapted to contain gas or liquid under pressure,
   a compensating plunger in said head between said diaphragms,
   said plunger being freely slidable up and down in said head and engaging said lower diaphragm and adapted to engage said upper diaphragm,
   said compensating plunger having a rigid upper part engagable with said upper diaphragm,
   and a resilient member attached to the lower end of said plunger and extending substantially the entire distance across the bottom thereof and presenting a flat, downwardly disposed surface,
   said downwardly disposed surface engaging said lower diaphragm.

6. The molding machine recited in claim 5 wherein said plunger is slidably received in said head, and means is provided on said plunger to limit the downward movement thereof.

7. The molding machine recited in claim 5 wherein a plurality of said plungers are received in said head, and each said plunger has an upper surface engaged by said upper diaphragm and a downwardly disposed surface engaged by said lower diaphragm.

8. The molding machine recited in claim 7 wherein a plurality of said heads are attached to a plate at their upper sides with spaces between said heads, said heads being adapted to enter a mold box with bars in said box disposed between said heads.

9. A molding machine head comprising
an upper box,
a plate forming a closure for said upper box,
an upper flexible diaphragm between said plate and said upper box,
means clamping said plate to said box with the outer edges of said diaphragm clamped therebetween,
a lower diaphragm,
open frames,
means clamping the edge of said lower diaphragm to said open frames,
means clamping said open frames to said mold box at the lower side thereof whereby said diaphragm and said plate form a top and bottom closure for said box,
a plunger slidably received in said upper box,
said plunger having a rigid upper portion having a flat upper surface engaging said upper diaphragm,
a resilient block on the lower side of said plunger engaging said lower diaphragm,
flanges extending outwardly from the sides of said plunger,
stop means engaging said flanges on said plunger in its lower position,
said upper diaphragm and said plate defining a space therebetween,
fluid under pressure in said space,
said head being adapted to be received within a flask filled with sand whereby said lower diaphragm engages said sand and when force is applied to said head, said fluid is compressed in said chamber as said sand is compressed.

References Cited by the Examiner

UNITED STATES PATENTS

| | | | |
|---|---|---|---|
| 2,859,796 | 11/1958 | Taunton | 100—211 |
| 3,041,685 | 7/1962 | Taccone | 22—42 |
| 3,123,873 | 3/1964 | Taccone | 22—42 |
| 3,156,958 | 11/1964 | Miller et al. | 22—42 |
| 3,209,414 | 10/1965 | Taccone | 22—42 |

FOREIGN PATENTS 227,988   5/1960   Australia.

J. SPENCER OVERHOLSER, *Primary Examiner.*

MARCUS U. LYONS, *Examiner.*

R. D. BALDWIN, *Assistant Examiner.*